(12) United States Patent
Wang et al.

(10) Patent No.: US 11,127,953 B2
(45) Date of Patent: Sep. 21, 2021

(54) CARBON NANOTUBE-TRANSITION METAL OXIDE COMPOSITE AND METHOD FOR MAKING THE SAME

(71) Applicants: Tsinghua University, Beijing (CN); HON HAI PRECISION INDUSTRY CO., LTD., New Taipei (TW)

(72) Inventors: Da-Tao Wang, Beijing (CN); Li Sun, Beijing (CN); Ke Wang, Beijing (CN); Jia-Ping Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 112 days.

(21) Appl. No.: 16/373,093

(22) Filed: Apr. 2, 2019

(65) Prior Publication Data
US 2019/0305310 A1    Oct. 3, 2019

(30) Foreign Application Priority Data

Apr. 3, 2018    (CN) .......................... 201810298529.4

(51) Int. Cl.
*H01M 4/587* (2010.01)
*C01B 32/174* (2017.01)
*H01M 4/485* (2010.01)

(52) U.S. Cl.
CPC ........... *H01M 4/587* (2013.01); *C01B 32/174* (2017.08); *H01M 4/485* (2013.01);
(Continued)

(58) Field of Classification Search
CPC ...... C01B 32/174; H01M 4/587; H01M 4/485
(Continued)

(56) References Cited

U.S. PATENT DOCUMENTS

| 7,413,723 B2 | 8/2008 | Niu et al. |
| 2006/0024503 A1 | 2/2006 | Wong et al. |
| (Continued) | | |

FOREIGN PATENT DOCUMENTS

| CN | 101173117 | 5/2008 |
| CN | 102040212 | 5/2011 |
| (Continued) | | |

OTHER PUBLICATIONS

Wang et al., Facile synthesis of MnO2/CNT nanocomposite and its electrochemical performance for supercapacitors, Materials Science and Engineering B 176 (2011) 1073-1078.

*Primary Examiner* — Douglas B Call
(74) *Attorney, Agent, or Firm* — ScienBiziP, P.C.

(57) ABSTRACT

The present invention relates to a carbon nanotube-transition metal oxide composite and a method for making the composite. The composite comprises at least one carbon nanotube and a plurality of transition metal oxide nanoparticles. The plurality of transition metal oxide nanoparticles are chemically bonded to the at least one carbon nanotube through carbon-oxygen-metal (C—O—M) linkages, wherein the metal is a transition metal element. The method for making the composite comprising the following steps: step 1, providing at least one carbon nanotube obtained from a super-aligned carbon nanotube array; step 2, pre-oxidizing the at least one carbon nanotube; step 3, dispersing the at least one carbon nanotube in a solvent to form a first suspension; step 4, dispersing a material containing transition metal oxyacid radicals in the first suspension to form a second suspension; and step 5, removing the solvent from the second suspension and drying the second suspension.

6 Claims, 12 Drawing Sheets

(52) U.S. Cl.
CPC ...... *C01B 2202/02* (2013.01); *C01B 2202/06* (2013.01); *C01P 2002/01* (2013.01); *C01P 2002/72* (2013.01); *C01P 2002/82* (2013.01); *C01P 2002/85* (2013.01); *C01P 2002/88* (2013.01); *C01P 2004/03* (2013.01)

(58) Field of Classification Search
USPC ..................................................... 423/447.1
See application file for complete search history.

(56) References Cited

U.S. PATENT DOCUMENTS

| | | |
|---|---|---|
| 2008/0160409 A1 | 7/2008 | Ishida et al. |
| 2011/0095237 A1 | 4/2011 | Liu et al. |
| 2011/0096465 A1 | 4/2011 | Zhou et al. |
| 2014/0099554 A1* | 4/2014 | Inoue .................... H01G 11/06 429/231.8 |
| 2015/0037673 A1* | 2/2015 | Zaghib ................. H01M 4/625 429/221 |
| 2015/0137024 A1* | 5/2015 | Lee ....................... C22C 1/1036 252/62.55 |
| 2015/0180029 A1 | 6/2015 | Bosnyak et al. |
| 2016/0229695 A1* | 8/2016 | Yoshiwara ............... C08K 7/24 |

FOREIGN PATENT DOCUMENTS

| | | |
|---|---|---|
| CN | 105289578 | 2/2016 |
| CN | 107454815 | 12/2017 |
| JP | 2014-523613 | 9/2014 |
| TW | 201133524 | 10/2011 |

\* cited by examiner

CARBON NANOTUBE-TRANSITION METAL OXIDE COMPOSITE AND METHOD FOR MAKING THE SAME

CROSS-REFERENCE TO RELATED APPLICATIONS

This application claims all benefits accruing under 35 U.S.C. § 119 from China Patent Application No. 201810298529.4, filed on Apr. 3, 2018, in the China National Intellectual Property Administration, the contents of which are hereby incorporated by reference. This application is related to applications entitled, "BATTERY ELECTRODE, METHOD FOR MAKING THE SAME AND HYBRID ENERGY STORAGE DEVICE USING THE SAME", filed on Apr. 2, 2019, with application Ser. No. 16/373,107.

FIELD

The present disclosure relates to a carbon nanotube-transition metal oxide composite and method for making the same, a method for making the same.

BACKGROUND

A transition metal oxide is a semiconductor with a certain band structure. The transition metal oxide has broad application prospects in many fields such as optoelectronics, catalysis, sensing, magnetism and energy storage. Due to their unique structure and properties, carbon nanotubes (CNT) have received a great deal of interest since the early 1990s. In particular, a composite material of the CNT and the transition metal oxides can achieve advantages of the two materials simultaneously or can exhibit a superior property. The CNT character in a large aspect ratio and its hollow structure. The CNT also character in its excellent mechanical property, electrical property and optical property. The CNT can enhance the property of the composite material, so that the composite material can achieve better physical and chemical properties. The carbon nanotube-transition metal oxide composite material has become a research focus of the scientific and technical personnel. However, the carbon nanotube-transition metal oxide composite material prepared by the prior art comprises the following disadvantages: a bonding force between the transition metal oxides and the CNT is weak; the transition metal oxides are easy to detach from the CNT and agglomerate. Thereby, the property of the composite material is definitely affected.

What is needed, therefore, is to provide a carbon nanotube-transition metal oxide composite, to solve the problems discussed above.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the exemplary embodiments. Moreover, in the drawings, like reference numerals designate corresponding parts throughout the several views.

FIG. 5 shows diagrams of nitrogen adsorption-desorption isotherm of the air-CNT and the $MnO_2$/aCNT composite; and FIG. 5 inset shows pore size distribution diagrams of the air-CNT and the $MnO_2$/aCNT composite.

DETAILED DESCRIPTION

The disclosure is illustrated by way of embodiments and not by way of limitation in the FIGures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different FIGures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "include," when utilized, means "include, but not necessarily limited to"; it specifically indicates open-ended inclusion or membership in the so-described combination, group, series, and the like.

A carbon nanotube-transition metal oxide composite is provided according to one embodiment. The carbon nanotube-transition metal oxide composite comprises at least one carbon nanotube and a plurality of transition metal oxide nanoparticles. The plurality of transition metal oxide nanoparticles are chemically bonded to the at least one carbon nanotube through carbon-oxygen-metal (C—O-M) linkages, wherein the metal is a transition metal element.

A diameter of the carbon nanotube is not limited. The carbon nanotube can be a single-walled carbon nanotube or a multi-walled carbon nanotube. In one embodiment, the carbon nanotube is a multi-walled carbon nanotube. The carbon nanotube-transition metal oxide composite can comprise one carbon nanotube or a plurality of carbon nanotubes. When the plurality of carbon nanotubes exist, the plurality of carbon nanotubes are entangled and closely combined with each other to form a free-standing film. The term "free-standing" implies, but is not limited to, that the carbon nanotube film can sustain the weight of itself when it is hoisted by a portion thereof without any significant damage to its structural integrity. The free-standing film can serve as a conductive network and an attachment carrier for the transition metal oxide nanoparticles.

The plurality of transition metal oxide nanoparticles can be distributed in the carbon nanotube-transition metal oxide composite uniformly. The plurality of transition metal oxide nanoparticles are chemically combined with the at least one carbon nanotube through C—O-M bonds. The C—O-M bond is formed by an oxygen atom bonded between a metal atom of the transition metal oxide and a carbon atom of the carbon nanotube. The transition metal oxide is not limited and can be selected from a group consisting of manganese dioxide ($MnO_2$), titanium dioxide ($TiO_2$), ferroferric oxide ($Fe_3O_4$), chromic oxide ($Cr_2O_3$), cobaltosic oxide ($Co_3O_4$), molybdenum dioxide ($MoO_2$), vanadium dioxide ($VO_2$), and combinations thereof.

A surface of the carbon nanotube can define at least one pore. The plurality of transition metal oxide nanoparticles are deposited on the surface of the carbon nanotube or in the at least one pore of the carbon nanotube.

In one embodiment, the carbon nanotube-transition metal oxide composite only consists of the at least one carbon nanotube and the plurality of transition metal oxide nanoparticles. In another embodiment, the carbon nanotube-transition metal oxide composite further comprises a small amount of structural water and metal ions. The metal ions can be alkali metal ions such as potassium ions ($K^+$). The metal ions and the structural water can stabilize the carbon nanotube-transition metal oxide composite.

In the present disclosure, the at least one carbon nanotube and the plurality of transition metal oxide nanoparticles are tightly bonded together through the C—O-M chemical bonds. The chemical bonds can prevent the plurality of transition metal oxide nanoparticles from falling off the carbon nanotube in some physicochemical reactions.

Figure 1:
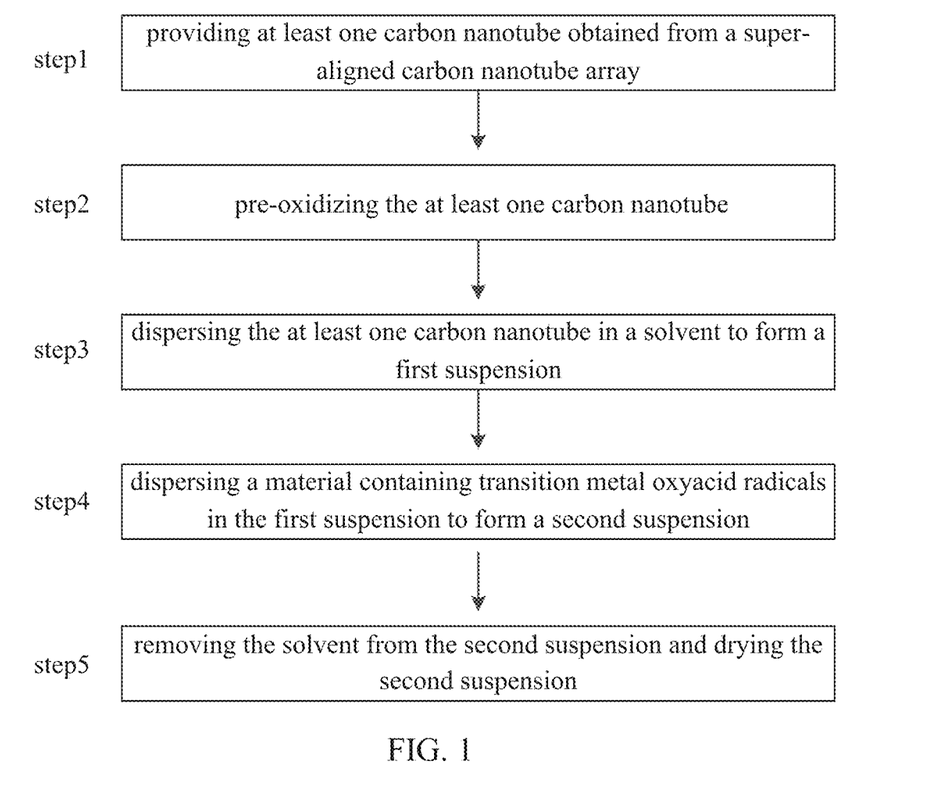
FIG. 1 shows a flow chart of a method for making a carbon nanotube-transition metal oxide composite according to one embodiment.

Referring to FIG. 1, a method for making the carbon nanotube-transition metal oxide composite comprises the following steps:
step 1, providing at least carbon nanotube obtained from a super-aligned carbon nanotube array;
step 2, pre-oxidizing the at least one carbon nanotube;
step 3, dispersing the at least one carbon nanotube in a solvent to form a first suspension;
step 4, dispersing a material containing transition metal oxyacid radicals in the first suspension to form a second suspension; and
step 5, removing the solvent from the second suspension and drying the second suspension.

The step S1~S1 are described in detail as followings.

In the step S1, the at least one carbon nanotube is provided. The at least one carbon nanotube is obtained from a super-aligned carbon nanotube array.

A diameter and a length of the carbon nanotube are not limited. The carbon nanotube can be a single-walled carbon nanotube or a multi-walled carbon nanotube. In one embodiment, the carbon nanotube is a multi-walled carbon nanotube in order to prevent the pre-oxidized carbon nanotube from being broken in the step 4.

The at least one carbon nanotube can be one carbon nanotube, or a plurality of carbon nanotubes. In one embodiment, the at least one carbon nanotube are a plurality of carbon nanotubes. When the plurality of carbon nanotubes are provided, arrangements of the plurality of multi-walled carbon nanotubes are not limited. The plurality of multi-walled carbon nanotubes can be disordered and arrange in various directions, or can be parallel to each other and extend along a same direction. The plurality of multi-walled carbon nanotubes extending in the same direction can be one or more, and the plurality of multi-walled carbon nanotubes are connected end to end by van der Waals force.

The super-aligned carbon nanotube array is prepared by a chemical vapor deposition method, and the method comprises the following steps: (a) providing a substantially flat and smooth substrate; (b) forming a catalyst layer on the substrate; (c) annealing the substrate with the catalyst layer in air at a temperature ranging from about 700° C. to about 900° C. for about 30 to 90 minutes; (d) heating the substrate with the catalyst layer to a temperature ranging from about 500° C. to about 740° C. in a furnace with a protective gas therein; (e) supplying a carbon source gas to the furnace for about 5 to 30 minutes and growing the super-aligned carbon nanotube array on the substrate.

In step (a), the substrate can be a P-type silicon wafer, an N-type silicon wafer, or a silicon wafer with a film of silicon dioxide thereon. In one embodiment, a 4-inch P-type silicon wafer is used as the substrate.

In step (b), the catalyst can be made of iron (Fe), cobalt (Co), nickel (Ni), or any alloy thereof.

In step (e), the super-aligned carbon nanotube array consists of the plurality of carbon nanotubes, and the plurality of carbon nanotubes are parallel to each other and perpendicular to the substrate. A height of the super-aligned carbon nanotube array is about 200 μm to about 400 μm.

The super-aligned carbon nanotube array formed under the above conditions is essentially free of impurities such as carbonaceous or residual catalyst particles.

In the step 2, the at least one carbon nanotube is pre-oxidized.

After the carbon nanotube is pre-oxidized, a plurality of sites with negative charge, such as oxygen-containing functional groups, can be formed on the surface of the carbon nanotube. A manner of the pre-oxidation of the at least one carbon nanotube is not limited. In one embodiment, the at least one carbon nanotube is heated for a period of time in an atmosphere of oxygen, carbon dioxide or air; the at least one carbon nanotube can be oxidized by oxygen, carbon dioxide or air. In another embodiment, the at least one carbon nanotube is immersed into a oxidizing solution such as a hydrogen peroxide or a acid solution for a period of time; the at least one carbon nanotube can be oxidized by the oxidizing solution. The acid solution can be a strong acid such as a sulfuric acid ($H_2SO_4$), a hydrochloric acid (HCl) or a nitric acid ($HNO_3$). What should be noted is that, the carbon nanotube can be etched or corroded by a strong oxidant such as oxygen or a strong acid, and a plurality of defect sites can be formed on the surface of the carbon nanotube. In one embodiment, the defect sites refer to pores on the surface of the carbon nanotube.

In one embodiment, the method of pre-oxidizing the plurality of carbon nanotubes comprises: placing the super-aligned carbon nanotube array of the step 1 in air; heating the super-aligned carbon nanotube array to 550° C. for about 30 minutes. After the pre-oxidization process, a plurality of pores are formed on surfaces of the plurality of carbon nanotubes of the super-aligned carbon nanotube array.

In the step 3, the at least pre-oxidized carbon nanotube is dispersed in a solvent via a sonication-assisted method, and a first suspension is formed.

After the at least one carbon nanotube is pre-oxidized, a wettability and dispersity of the carbon nanotube can be increased. Therefore, when the plurality of carbon nanotubes are pre-oxidized, the plurality of pre-oxidized carbon nanotubes can easily and uniformly dispersed in the solvent.

The solvent can be an organic solvent, water, or a mixed solvent of organic solvent and water. In order to prevent the transition metal oxyacid radicals from reacting with other substances in the step S4, in one embodiment, the solvent is deionized water. In addition, when the solvent is water, the transition metal oxyacid radicals can react with the pre-oxidized carbon nanotube in water. Therefore the carbon nanotube-transition metal oxide composite prepared in the step S5 comprise the structural water. The structural water facilitates the stability of the structure of the carbon nanotube-transition metal oxide composite.

When the at least carbon nanotube are the plurality of carbon nanotubes, since the plurality of carbon nanotubes are easily agglomerated in water, the plurality of carbon nanotubes can be dispersed uniformly in a water-miscible organic solvent first, and then the water-miscible organic solvent is gradually replaced with water. In this way, the solvent of the first suspension can be water.

In one embodiment, after being pre-oxidized, the plurality of pre-oxidized carbon nanotubes are dispersed uniformly in ethanol first, and then the ethanol is gradually replaced with the deionized water.

In the step S4, a material containing transition metal oxyacid radicals is dispersed in the first suspension, and a second suspension is formed.

The material containing transition metal oxyacid radicals can be a transition metal oxyacid or a transition metal oxyacid salt. A valence of a transition metal element in the material must be higher than that of the transition metal element in the transition metal oxide to be prepared. Wherein, the transition metal oxyacid can be selected from a group consisting of permanganic acid ($HMnO_4$), titanic acid ($H_4TiO_4$), chromic acid ($H_2CrO_4$), dichromic acid ($H_2Cr_2O_7$), ferric acid ($H_2FeO_4$), cobalt acid ($H_3CoO_4$), molybdenum acid ($H_2MoO_4$), vanadic acid ($H_3VO_4$), and combinations thereof. The transition metal oxyacid salt can be selected from a group consisting of permanganate, titanate, chromate, dichromate, ferrate, cobaltate, molybdate, vanadate, and combinations thereof. The transition metal oxyacid salt can be potassium permanganate ($KMnO_4$), potassium titanate ($K_4TiO_4$), potassium chromate ($K_2CrO_4$), potassium dichromate ($K_2Cr_2O_7$), potassium ferrate ($K_2FeO_4$), potassium cobaltate ($K_3CoO_4$), potassium molybdate ($K_2MoO_4$), potassium vanadate ($K_3VO_4$).

The material containing transition metal oxyacid radicals can be added to the first suspension directly. Alternatively, a suspension of the material is formed first and then is mixed with the first suspension. The material containing transition metal oxyacid radicals can be dispersed in the first suspension uniformly by stirring. The transition metal oxyacid radicals become transition metal oxyanions in the first suspension. During the process of stirring, a redox reaction between the transition metal oxyanions and the sites with negative charge occurs to form a plurality of transition metal oxide nanoparticles. The transition metal oxide nanoparticles are chemically combined with the carbon nanotubes through C—O-M bonds. The C—O-M bond is formed by an oxygen atom bonded between a metal atom of the transition metal oxide and a carbon atom of the carbon nanotube.

The redox reaction between the transition metal oxyanions and the pre-oxidized carbon nanotube needs no heating and can be carried out at room temperature. Moreover, during the redox reaction, the transition metal oxyanions can be uniformly contacted with the pre-oxidized carbon nanotube by continuously stirring. Thereby the transition metal oxide nanoparticles can be uniformly distributed in the carbon nanotube-transition metal oxide composite.

In one embodiment, the material containing transition metal oxyacid radicals is $KMnO_4$. The $KMnO_4$ is added into the first suspension to form a mixed solution. The mixed solution is stirred by a magnetic bar for 1 day to 8 days at room temperature. During the process above, the $KMnO_4$ reacts with the pre-oxidized carbon nanotube to produce $MnO_2$ nanoparticles on the surface or in pores of the carbon nanotube.

In the step S5, the solvent of the second suspension is removed. The remaining substance is dried to form the carbon nanotube-transition metal oxide composite.

The solvent in the second suspension can be filtered out by vacuum filtration. The remaining substance comprises the at least one carbon nanotube and the plurality of transition metal oxide nanoparticles. The plurality of transition metal oxide nanoparticles are chemically combined with the at least one carbon nanotube through C—O-M linkages. When the at least one carbon nanotube are the plurality of carbon nanotubes, the plurality of carbon nanotubes are entangled and closely combined with each other to form a free-standing and flexible film. The plurality of transition metal oxide nanoparticles are uniformly distributed in the film.

In one embodiment, the deionized water in the second suspension is removed by vacuum filtration. A composite film comprising the plurality of carbon nanotubes and $MnO_2$ nanoparticles is obtained. The composite film is free-standing.

FIG. 2~FIG. 12 shows a series of characterization of the composite prepared in one embodiment. Wherein, the pristine CNT is the carbon nanotubes without any treatment, the air-CNT is the carbon nanotubes oxidized by the air, and the $MnO_2$/aCNT composite is a product of the redox reaction between the air-CNT and the transition metal oxyanions.

Figure 2:
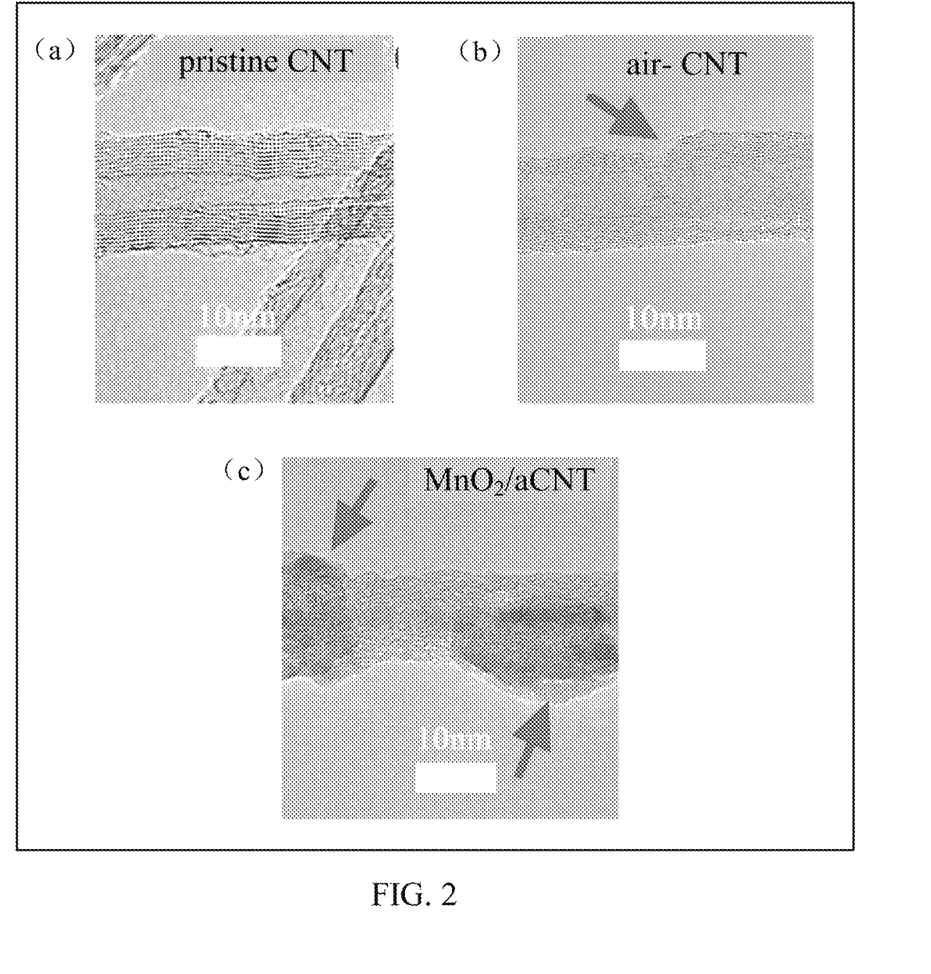
FIG. 2 shows transmission electron microscope (TEM) images of a pristine CNT, an air-CNT and an $MnO_2$/aCNT composite, respectively.

Referring to FIG. 2, the surface of the pristine CNT is smooth. The surface of the air-CNT is corroded and formed with defective sites. As is shown in FIG. 2c, during the reaction of $KMnO_4$ with the air-CNT, nanoparticles are formed on the surface of the carbon nanotube.

Figure 3:
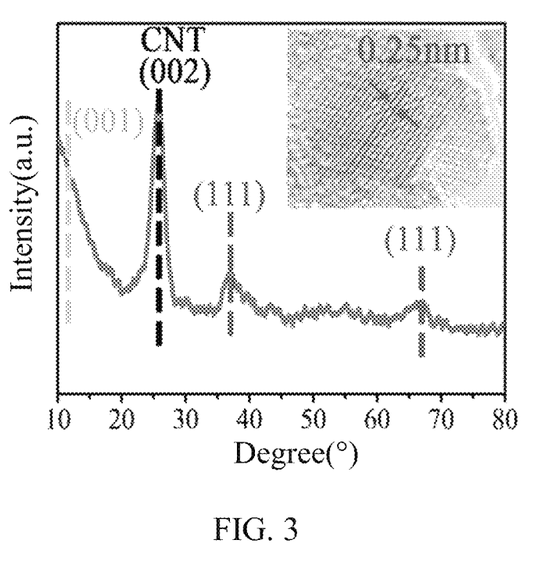
FIG. 3 shows an X-ray diffraction (XRD) pattern of the $MnO_2$/aCNT composite.
Figure 4:
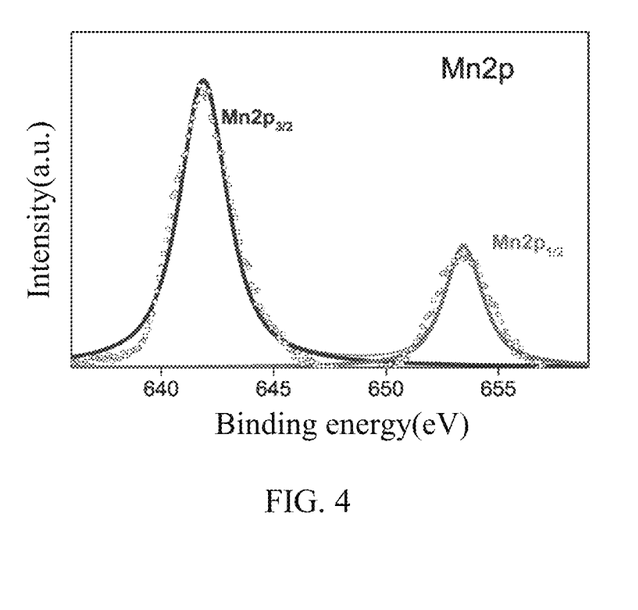
FIG. 4 shows an Mn 2p X-ray photoelectron spectroscopy (XPS) diagram of the $MnO_2$/aCNT composite.

The nanoparticles on the surface of the carbon nanotube are further identified as $\delta$-$MnO_2$ referring to FIG. 3 and FIG. 4. As is shown in FIG. 3, the strong peak at around 26° in the XRD pattern is attributed to the (002) crystal planes of the graphite lattice in CNT. Other peaks match well with those of birnessite-type $\delta$-$MnO_2$ phase. An interplanar $d_{100}$-spacing of 0.25 nm observed in $MnO_2$ nanocrystals (As is shown in FIG. 3 inset) is also consistent with literature report for monoclinic birnessite-type $\delta$-$MnO_2$. FIG. 4 demonstrated the core level binding energy for Mn 2p peaks. The binding energy for Mn $2p_{3/2}$ and Mn $2p_{1/2}$ are observed at 642.0 and 653.5 eV, which are close to $Mn^{4+}$ oxidation state.

Figure 5:
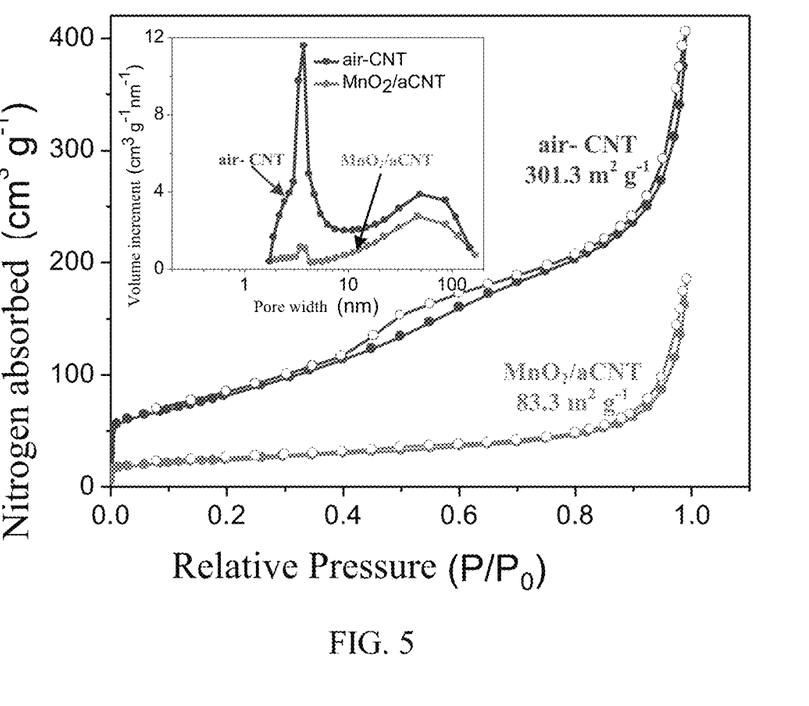

As is shown in FIG. 5 and FIG. 5 inset, a plurality of pores are formed on the surface of the air-CNT, and sizes of the pores mainly concentrate at 3.7 nm and 62 nm. However, after the redox reaction between the air-CNT and $KMnO_4$, a specific surface area of the air-CNT decreases and the pores of 3.7 nm almost disappear. Therefore, the $MnO_2$ nanoparticles are formed on the surface of the air-CNT. The $MnO_2$ nanoparticles are also formed in the pores of the air-CNT.

Figure 6:
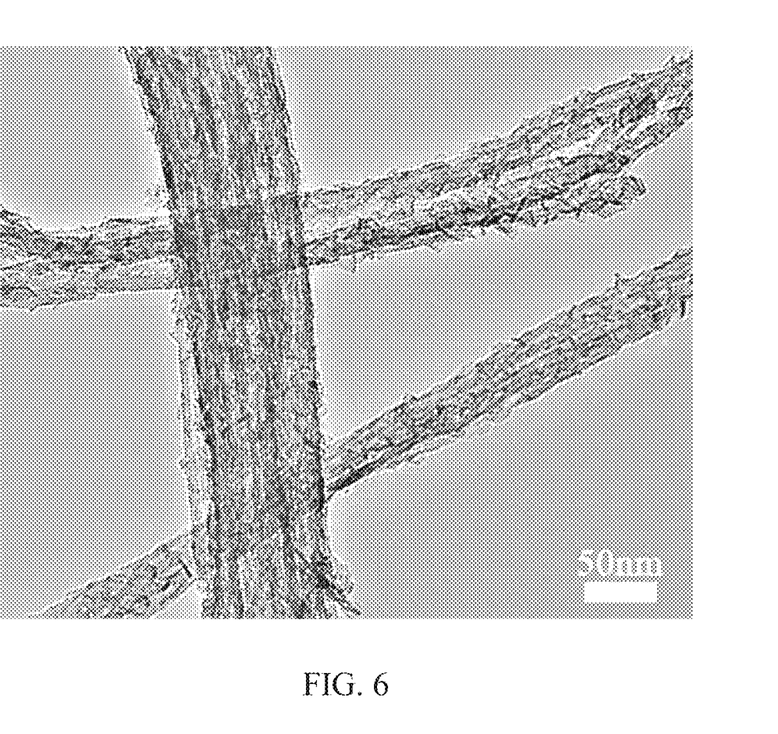
FIG. 6 shows a TEM image of the $MnO_2$/aCNT composite.

As is shown in FIG. 6, a size of the $MnO_2$ nanoparticles is about 10 nm. The ultrathin $MnO_2$ nanoparticles are either uniformly anchored on surfaces of the air-CNT or encapsulated between adjacent nanotubes. No extra $MnO_2$ nanoparticles agglomerated outside the CNT bundles.

Figure 7:
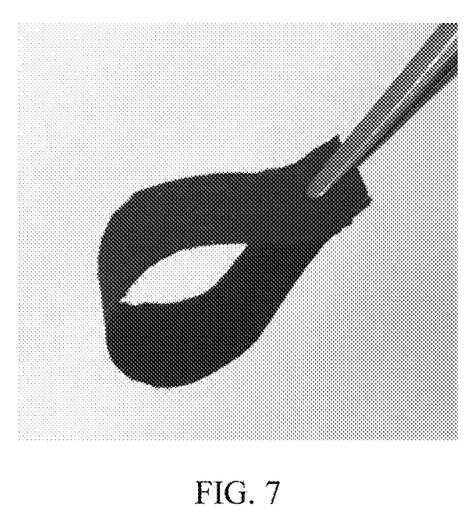
FIG. 7 shows a photograph of a $MnO_2$/aCNT composite film.

As is shown in FIG. 7, the $MnO_2$/aCNT composite film structure is a free-standing flexible structure.

Figure 8:
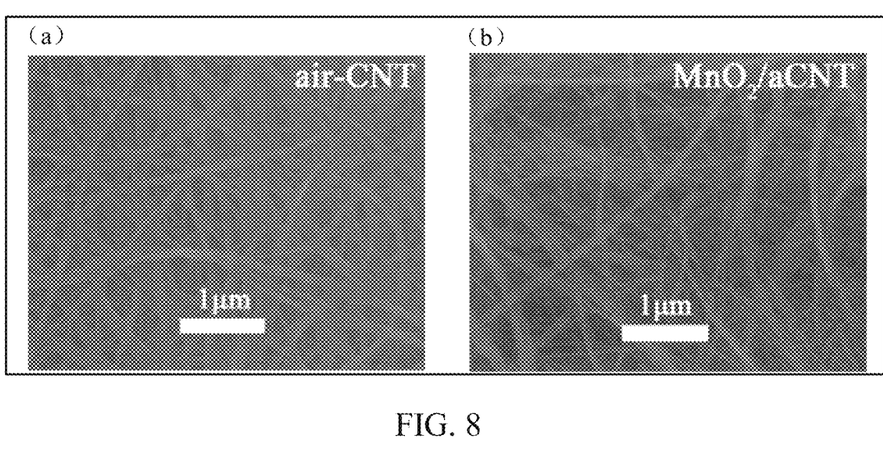
FIG. 8 shows scanning electron microscope (SEM) images of the air-CNT and the $MnO_2$/aCNT composite, respectively.

As is shown in FIG. 8, a morphology of the air-CNT is similar to that of the $MnO_2$/aCNT composite. Thus, the $MnO_2$ nanoparticles is uniformly coated onto the air-CNT scaffold without aggregation.

Figure 9:
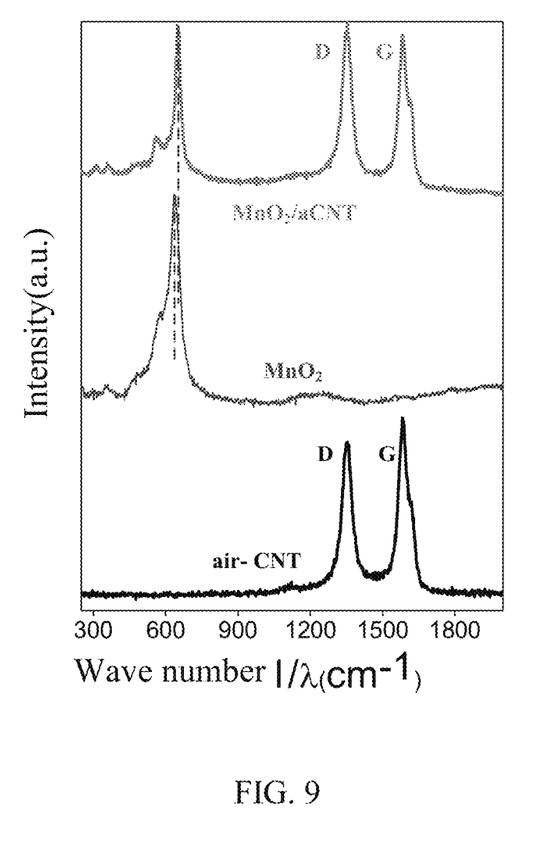
FIG. 9 shows a Raman spectra of the air-CNT, a $MnO_2$ powder and the $MnO_2$/aCNT composite, respectively.

As is shown in FIG. 9, two Raman peaks locate at 1348 $cm^{-1}$ (D peak) and 1582 $cm^{-1}$ (G peak) in the Raman spectra of the air-CNT and the $MnO_2$/aCNT composite film structure. A relative value of an intensity of a D peak represents an amount of $sp^3$ carbon atoms. That is, a six-membered ring of the multi-walled carbon nanotube is destroyed, and an destroyed location of the six-membered ring can be an oxidation site. The relative value of the intensity of a G peak represents an amount of $sp^2$ carbon atoms. That is, the six-membered ring of the multi-walled carbon nanotube is intact and not destroyed. It is shown that the process of producing $MnO_2$ nanoparticles basically retains the structure of the air-CNT. An increased intensity ratio of D peak to G peak suggests a higher defect concentration of the air-CNT due to $KMnO_4$ oxidation. In addition, both the Raman peak at 634 $cm^{-1}$ of the $MnO_2$ powder and the Raman peak at 650 $cm^{-1}$ of the $MnO_2$/aCNT composite film structure are correspond to a stretching vibration of the Mn—O bond. A frequency difference of $MnO_2$ (634 $cm^{-1}$) and the $MnO_2$/aCNT composites (650 $cm^{-1}$) can be correlated to shorter Mn—O chemical bonds due to the local lattice distortion by $K^+$ incorporation into a interlayer region.

Figure 10:
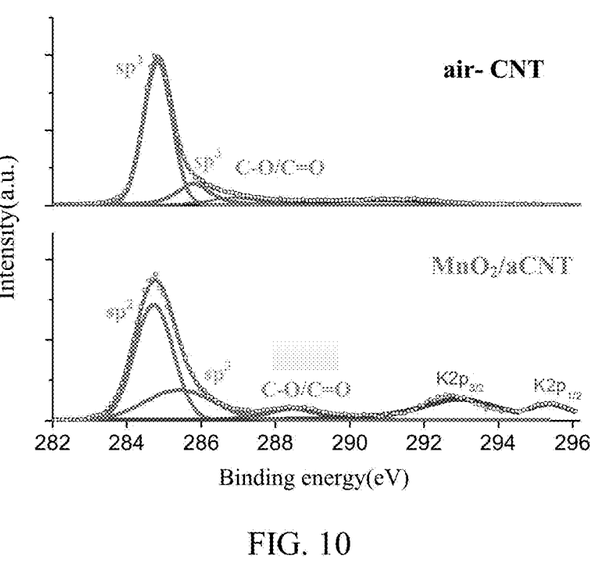
FIG. 10 shows carbon (C) 1s and K 2p XPS diagram of the air-CNT and the $MnO_2$/aCNT composite.

As is shown in FIG. 10, a presence of $K^+$ in $MnO_2$/aCNT composite is further indicated by two peaks located at 292.9 and 295.5 eV related to K $2p_{3/2}$ and K $2p_{1/2}$ levels in XPS spectra. Excess $K^+$ in the interlayer region can stabilize a two-dimensional structure of $MnO_2$ and improve the stability of the $MnO_2$/aCNT composite.

Figure 11:
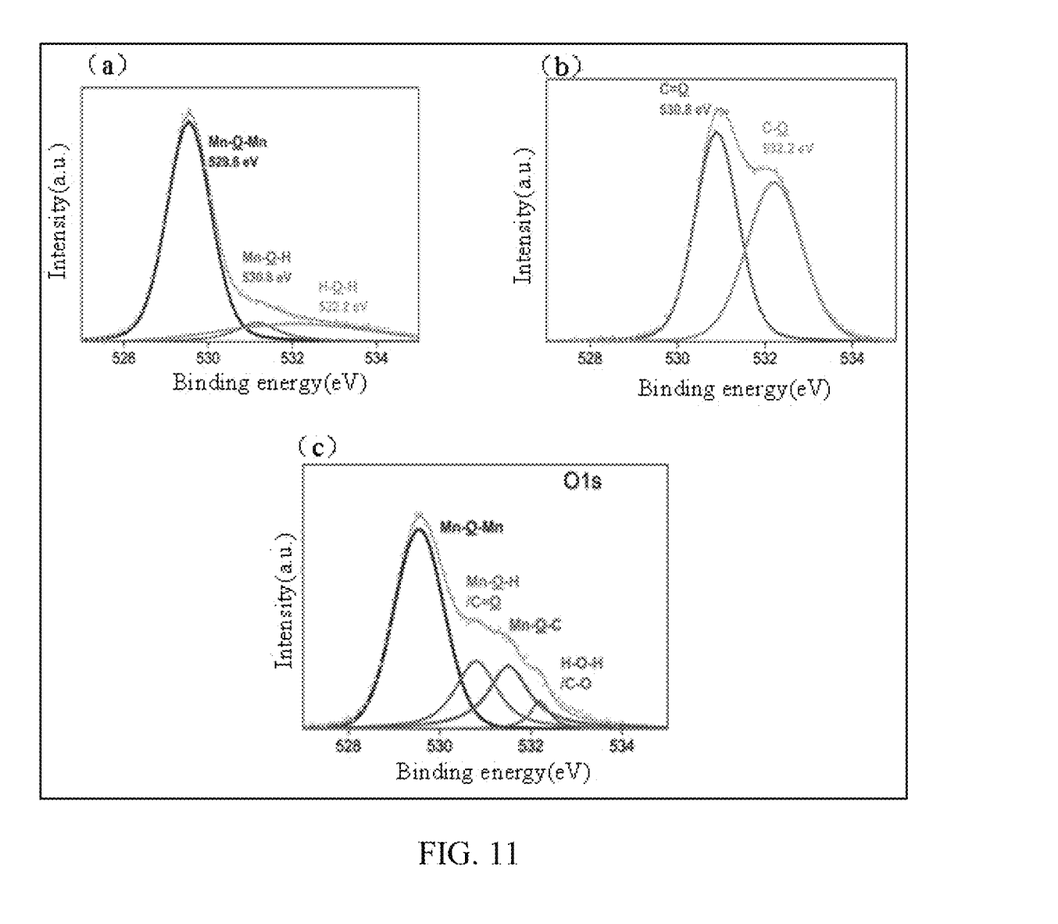
FIG. 11 shows oxygen 1s XPS spectra of the $MnO_2$ powder, the air-CNT and the $MnO_2$/aCNT composite, respectively.

Referring to FIG. 11a, for the $MnO_2$ powder, three peaks located at 529.6 eV, 530.8 eV and 532.2 eV are assigned to oxide (Mn—O bond), and hydroxide (Mn—O—H bond) and structural water (H—O—H bond), respectively. Referring to FIG. 11b, for the air-CNT, two peaks located at 530.8 eV and 532.2 eV are ascribed to C=O and C—O bonds, respectively. Referring to FIG. 11c, for the $MnO_2$/aCNT composite, four peaks appearing at 529.6 eV, 530.8 eV, 531.5 eV and 532.2 eV, correspond to oxide (Mn—O—Mn), hydroxide (Mn—O—H)/C=O bonds, Mn—O—C bond and structural water (H—O—H)/C—O bonds, respectively. Wherein, compared with the $MnO_2$ powder and the air-CNT, an extra peak of 531.5 eV of the $MnO_2$/aCNT composite indicates a large fraction of C—O groups can come from the Mn—O—C bond at $MnO_2$/aCNT interface. Oxygen-containing groups on carbon templates can capture and react with various metal anions (such as $VO_3^-$, $MnO_4^-$, $MoO_4^-$), and metal oxide can be produced. The ultrathin $MnO_2$ nanoparticles and the air-CNT are chemically hybridized with each other through the C—O—Mn bond. This robust interaction can prevent the active materials detaching from the carbon nanotube and agglomerating on the surface of the carbon nanotube.

Figure 12:
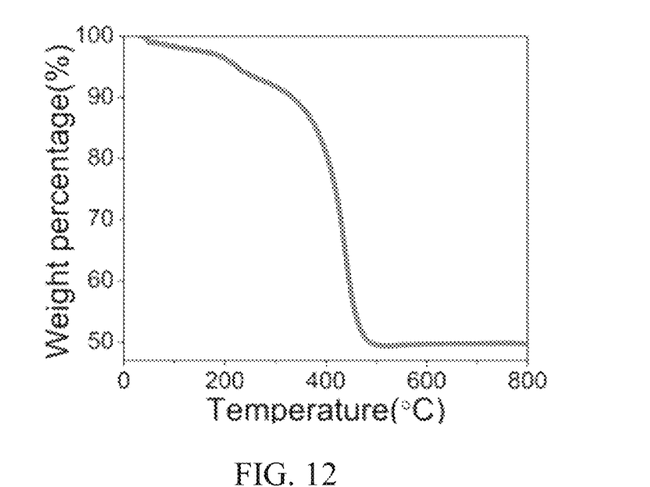
FIG. 12 shows a thermogravimetric analysis (TGA) curve of the $MnO_2$/aCNT composite.

Referring to FIG. 12, water contained in the $MnO_2$/aCNT composite can be divided into physically adsorbed water and chemisorbed structural water, wherein the former can be evaporated at 100° C. and the latter can be removed at 100~300° C. The $MnO_2$/aCNT composite suffers a serious mass loss at the temperature in a range from about 300° C. to about 500° C., as the air-CNT of the $MnO_2$/aCNT composite become gas due oxidation reaction. A last remaining material is the $MnO_2$ nanoparticles. In the MnO2/aCNT composite, a mass fraction of the $MnO_2$ nanoparticles is estimated to about 50 wt %, the mass fraction of the air-CNT is about to 42 wt %, and the mass fraction of the structural water is estimated to a moderate amount of 4~7 wt %.

In summary, the $MnO_2$/aCNT composite film prepared in one embodiment is a flexible and self-supporting structure. Wherein, $MnO_2$ is a δ phase. The size of the $MnO_2$ nanoparticles is less than 10 nanometers. The $MnO_2$ nanoparticles are uniformly distributed on the surface of the carbon nanotube or in the pores of the carbon nanotube. The $MnO_2$ nanoparticles are tightly bound to the carbon nanotubes by C—O—Mn chemical bonds. In addition, the $MnO_2$/aCNT composite also comprises $K^+$ and structural water. The $K^+$ and structural water can be beneficial to stabilize the structure of the $MnO_2$/aCNT composite film and prevent the $MnO_2$ nanoparticles from detaching from the surface of the carbon nanotube in some phytochemical reactions.

The carbon nanotube-transition metal oxide provided in the present disclosure comprises the following advantages.

Firstly, the transition metal oxide nanoparticles are attached to the carbon nanotube through C—O-M chemical bonds. Therefore, the transition metal oxide nanoparticles are not easy to agglomerate and detach from the surface of the carbon nanotube.

Secondly, the transition metal oxides are nano-sized particles and uniformly dispersed in the composite.

Thirdly, the composite further comprises the structural water and alkali metal ions. The structural water and alkali metal ions can help the stability of the composite.

Fourthly, the carbon nanotube-transition metal oxide composite can be a flexible and free-standing film.

Fifthly, the composite can be applied to various fields such as catalysis, energy storage, environmental protection, or exhaust gas treatment.

The method for preparing the carbon nanotube-transition metal oxide composite provided in the present disclosure comprises the following advantages.

Firstly, the transition metal oxyacid radicals react with the air-oxidized carbon nanotubes to produce the transition metal oxide nanoparticles. The transition metal oxide nanoparticles are tightly attached to the carbon nanotubes through chemical bonds. In addition, due to continuous stirring and mixing during the reaction, the transition metal oxide can be uniformly distributed in the battery electrode.

Secondly, the method can be carried out at room temperature. No reagents other than water or ethanol are needed. No toxic substances are produced during the preparation. Therefore, the method is simple and environmentally friendly.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A carbon nanotube-transition metal oxide composite, consisting of:
   at least one carbon nanotube, alkali metal ions, a structural water, and a plurality of transition metal oxide nanoparticles, wherein the plurality of transition metal oxide nanoparticles are chemically bonded to the at least one carbon nanotube through carbon-oxygen-metal (C—O-M) linkages, and M represents a transition metal element.

2. The carbon nanotube-transition metal oxide composite of claim 1, wherein the at least one carbon nanotube comprises at least one multi-walled carbon nanotube.

3. The carbon nanotube-transition metal oxide composite of claim 1, wherein the at least one carbon nanotube comprises a plurality of carbon nanotubes, and the plurality of carbon nanotubes are entangled and combined with each other to form a free-standing and flexible film.

4. The carbon nanotube-transition metal oxide composite of claim 1, wherein the transition metal oxide is selected from a group consisting of manganese dioxide, titanium dioxide, ferroferric oxide, chromic oxide, cobaltosic oxide, molybdenum dioxide, vanadium dioxide, and combinations thereof.

5. The carbon nanotube-transition metal oxide composite of claim 1, wherein a surface of the carbon nanotube defines at least one pore.

6. The carbon nanotube-transition metal oxide composite of claim 1, wherein the alkali metal ions are potassium ions.

* * * * *